Oct. 18, 1955 J. SELZ ET AL 2,721,264

DEVICE FOR OBTAINING MULTIPLE OR SUB-MULTIPLE FREQUENCIES OF A GIVEN FREQUENCY

Filed June 9, 1949 2 Sheets-Sheet 1

INVENTORS
JACQUES SELZ
JEAN ILTIS

BY Paul M. Craig, Jr.
ATTORNEY

INVENTORS
JACQUES SELZ
JEAN ILTIS

BY Paul M. Craig, Jr.
ATTORNEY

United States Patent Office 2,721,264

Patented Oct. 18, 1955

2,721,264

DEVICE FOR OBTAINING MULTIPLE OR SUB-MULTIPLE FREQUENCIES OF A GIVEN FREQUENCY

Jacques Selz, Paris, and Jean Iltis, Asnieres, France, assignors to Compagnie Industrielle des Telephones, Paris, France Application June 9, 1949, Serial No. 98,125

Claims priority, application France June 11, 1948

14 Claims. (Cl. 250—36)

The present invention relates to a self-starting oscillator in which the frequency bears a simple fractional relationship to a given frequency.

More particularly, the present invention relates to a self-starting oscillator which does not depend on any external aid to start the oscillations thereof, and which comprises an amplifier in the output of which are provided a number of selective circuits which separate the different frequencies from each other, and a plurality of groups of modulators, of which at least one modulator of the first group is connected to the input circuit of the amplifier and of which at least one modulator of the second group is connected to the output circuit of the amplifier, whereby the modulators of the first group produce as a modulation product of the second degree a first series of intermediate frequencies which are collected in the output circuit of the amplifier after amplification thereof.

Accordingly, it is an object of the present invention to provide a new self-starting oscillator.

Another object of the present invention is the provision of a new method and apparatus to obtain in a simple and reliable manner derived frequencies which are multiples or sub-multiples of a given frequency.

The invention will be understood from the following specification and the accompanying drawings, in which.

Figure 1:
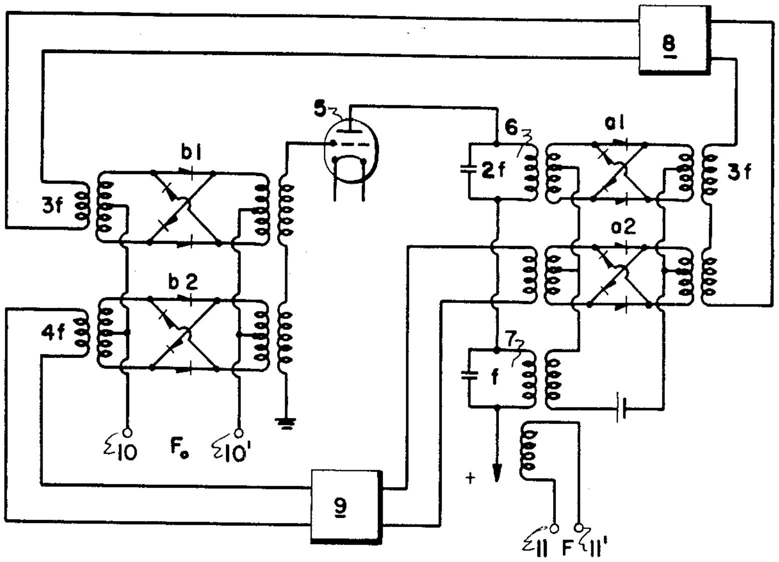
Figure 1 is a circuit diagram of an arrangement in accordance with the present invention employing four modulators to divide an input frequency by five.

It is well-known in the prior art that in order to divide a given frequency $F_0$ by an integer $n$, on the one hand, the input frequency $F_0$ to be divided and, on the other hand, the harmonic of the order $n-1$ of the frequency $$F=\frac{F_0}{n}$$

which is to be obtained are applied or fed to a mixer or beater. As a result of the mixing action in the mixer or beater an output frequency $$F_0-(n-1)\frac{F_0}{n}=\frac{F_0}{n}=F$$

is obtained at the output terminals of the mixer or beater. In the prior art methods or apparatus the auxiliary harmonic frequency $(n-1)F$, which is used in this manner, is generally obtained by multiplication of the desired output frequency F.

However, when the apparatus of the prior art is first put into operation, the desired output frequency F is not yet normally produced as such, but is only found among other parasitic frequencies existing in the system, and at that only with a very low amplitude. At the same time, the multiplier used for multiplying the frequency F, which makes it possible to obtain this harmonic $n-1$, is a non-linear device which operates only when it receives a voltage above a certain threshold level, and does not start to operate, in particular, for the initial voltage of the desired output frequency F which is too small, i. e., which is below the threshold level.

It was, therefore, necessary in apparatus of this kind in the prior art to utilize, in order to obtain the auxiliary frequency, an additional separate oscillator of frequency $(n-1)F$, which was put into use at the moment the system was started, and was then shut off manually or automatically, when the voltage of the desired output frequency F had been established with sufficient amplitude.

The object of the present invention is to provide a method and apparatus which obviates the use of such an additional separate oscillator. Moreover, the present invention has a wider application and makes it possible to obtain a group of a certain number of desired output frequencies designated Q, which bear a rational fixed relation to the given input frequency.

The present invention is characterized by the use of a certain number of auxiliary frequencies of a group designated P, which are self-starting in the anode circuits of one or more amplifier tubes by reason of the existing signal noise spectrum in the tube, and by the formation of another group of frequencies $\phi$ by intermodulation of the frequencies of group P with each other, whereby one of the frequencies of group $\phi$ may, moreover, be equal to one of the frequencies of group P, the groups of frequencies P and $\phi$ being so chosen that the combination of the frequencies $\phi$ with the given input frequency $F_0$ reconstitutes all the frequencies of the group P, while the groups of frequencies P and $\phi$ contain, on the other hand, the desired frequencies of the group Q.

The auxiliary frequencies of group P may have different values depending on the requirements, and in the examples considered herein, the group P may have frequencies of values $f$ and $2f$, $f$ and $3f$, or $nf$ . . . $2nf$. The choice of the particular auxiliary frequencies for group P depends on the particular circuit arrangement to be employed.

To be more exact, if it be desired to obtain from a given input frequency $F_0$ a certain number $p$ of output frequencies of a group Q of the form $$F_s=K_sF_0(s=1,\ 2\ .\ .\ .\ p)$$

the coefficients $K_s$ being integers or fractional numbers, then, by means of resonant circuits or filter networks, a group of $m$ auxiliary frequencies from a group P are selected from the frequencies of the noise spectrum of the output of one or more amplifier tubes which are operated over a non-linear portion of their characteristic. The group of $m$ auxiliary frequencies of a group P thus derived in the anode circuits of the tubes are then combined with each other in one or more beaters or mixers of a first array ($a$) so as to obtain a group of $n$ frequencies of the group $\phi$, the desired output frequencies being comprised in the groups of frequencies P or $\phi$; the desired output frequencies of group $\phi$ are then applied to the input circuits of one or more beaters or mixers of a second array ($b$), to which are also applied signals of the given input frequency $F_0$ to be divided in such a manner that all the frequencies of group P present at the output terminals of the second array of beaters or mixers ($b$) are fed back to the grid circuits of the various tubes, each frequency of the group P being fed back to the tube from the anode circuit of which it has been selected. If this is not done, random frequencies adjacent to the desired frequencies are likely to remain present, within the limits permitted by the selective filter networks as well as by the band-pass filters inserted to eliminate the undesired frequencies introduced by the operation of the beaters or mixers. It is possible to employ beaters or mixers of any type in the arrangement according to the present invention; however, in accordance with a preferred form of the present invention, ring-type symmetrical beaters or mixers with dry rectifier elements are employed which are composed of a combination of rectifiers.

It is necessary that the relations or equations established, on the one hand, in a first array of beaters or mixers $a$ between the group of frequencies P and $\phi$, and, on the other hand, in a second array of beaters or mixers $b$ between the input frequency $F_0$ and the frequencies of the groups P and $\phi$ be sufficient to determine completely the frequency groups P and $\phi$.

The first array of beaters or mixers $a$ gives a set (A) of $n$ relations or equations between the frequencies of group $\phi$ and the frequencies of group P, of the following form:

$$\text{(A)} \qquad \phi_j=\sum_{k=1}^{k=m} a_{jk}\cdot f_k$$

($j=1, 2 \ldots n$), $k$ being integers, and the coefficients $a_{jk}$ being integers, either positive or negative, or zero.

The second array of beaters or mixers $b$ determines another set (B) of $m$ relations or equations between the input frequency $F_0$ and the frequencies of groups P and $\phi$, of the following form:

$$\text{(B)} \qquad \pm F_0=\phi_j\pm f_k=\sum_{s=1}^{s=m} a_{js}\pm f_k$$

the same frequency $\phi_j$ being able to appear in two relations or equations if both the frequencies $F_0+\phi_j$, and $F_0-\phi_j$ are used.

The relations or equations (B) must determine the frequencies of group P in an unique manner, which requires that the determinant formed by the coefficients of the P group be different from zero.

In the case in which the output frequencies of the group which are sought to be obtained are lower than the input frequency $F_0$, and in which the same applies with respect to the frequencies of the groups P and $\phi$, it is clear that the beaters or mixers of the array $b$ can only reconstitute the frequencies of group P in the form $F_0-\phi$, in which case the frequencies of groups $\phi$ and P are then equal in number to $m$.

For this case, the group of relations or equations of form (A) becomes:

$$\text{(A')} \qquad \phi_j=\sum_{k=1}^{k=m} a_{jk} f_k$$

$$(j=1, 2 \ldots m).$$

and by a suitable choice of notation of the groups of frequencies $\phi$, the group of equations of form (B) may be written:

$$\text{(B')} \qquad F_0=\phi_j+f_j=\sum_{k=1}^{k=m} a_{jk} f_k+f_j$$

The determinant of Equations A′ and B′ is as follows:

$$D_m=\begin{Bmatrix} a_{11}+1 & a_{12}\ldots\ldots & a_{1m} \\ a_{21} & a_{22}+1 & a_{2m} \\ a_{m1} & a_{m2} & a_{mm}+1 \end{Bmatrix}$$

It is thus necessary that $D_m$ be different from zero in order to obtain only the frequencies desired.

Different circuit arrangements embodying these relations are shown in the various figures of the drawing which show, for purposes of illustration only, several embodiments in accordance with the present invention, and in which like parts are designated by like reference numerals throughout the various views.

Referring now more particularly to Figure 1 of the drawing, reference numerals $a_1$, $a_2$, $b_1$ and $b_2$ designate bridge-type beaters or mixers, 5 an amplifier tube, 6 and 7 two tuned circuits, tuned to the auxiliary frequencies $f$ and $2f$, 8 and 9 two band-pass filter networks, 10 and 10′ the input terminals for the input frequency $F_0$ to be divided, and 11 and 11′ the output terminals for the output frequency $$F=f=\frac{F_0}{5}.$$

The input frequency $F_0$ is applied to the mid-terminal points of the beaters or mixers $b_1$ and $b_2$, while the frequency $3f$ is applied to the input terminals of beater or mixer $b_1$ and the frequency $4f$ to the input terminals of the beater or mixer $b_2$. The resultant auxiliary beat frequencies $f$ and $2f$ from mixers $b_1$ and $b_2$ are applied to the grid of the amplifier tube 5, and the tuned circuits 6 and 7 connected in the plate circuit of tube 5 make it possible to filter or separate out these frequencies $f$ and $2f$ respectively after amplification thereof in tube 5 and also to generate the low voltages at these frequencies necessary for starting the operation of the divider circuit arrangement.

The frequency $f+2f=3f$ is produced in the beater or mixer $a_1$ whose input terminals are supplied from tuned circuit 6 and whose control terminals are supplied with a frequency $f$ from tuned circuit 7, and the frequency $f+3f=4f$ is produced in the beater or mixer $a_2$ whose control terminals are supplied with frequency $f$ from tuned circuit 7 and whose input terminals are supplied from filter 8.

The frequencies $3f$ and $4f$ are applied to the input terminals of beaters or mixers $b_1$ and $b_2$ respectively, as has been indicated above, through the band-pass filter networks 8 and 9. The frequencies produced adjacent or very close to the frequencies $f$, $2f$, $3f$, $4f$ which may be generated during the operation of the system, as for example by modulators $b_1$, $b_2$, $a_1$, $a_2$ as a result of intermodulation, are designated by $f_1$, $f_2$, $f_3$, $f_4$.

The beaters or mixers $a_1$ and $a_2$ respectively provide the following relations or equations as a result of intermodulation:

(A)

$$f_3=f_1+f_2$$
$$f_4=f_1+f_3$$

and the beaters or mixers $b_1$ and $b_2$ respectively provide the following relations or equations:

(B)

$$F_0=5F=f_2+f_3$$
$$F_0=5F=f_1+f_4$$

By substituting in the equations of B, the values of $f_3$ and $f_4$ as determined by equations A, equations B may be rewritten as follows:

$$f_1+2f_2=3f_1+f_2=5F$$

Hence the desired division has been obtained.

Figure 2:
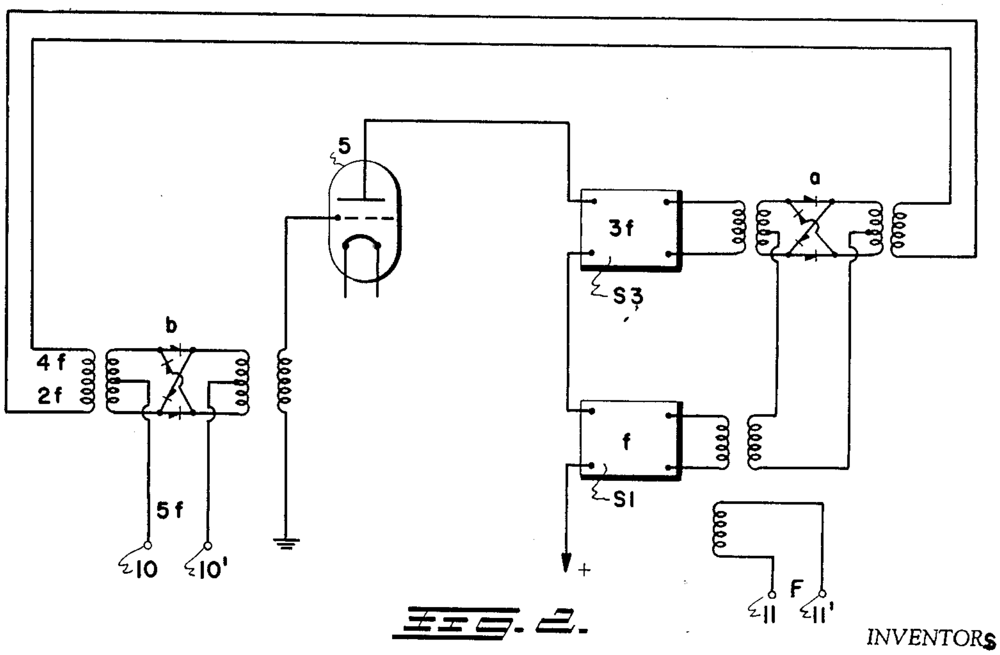
Figure 2 is a circuit diagram of a modified embodiment in accordance with the present invention employing two modulators to divide an input frequency by five.

Figure 2 shows a different embodiment from that of Figure 1 in that the circuit arrangement may be used with frequencies $f$ and $3f$ as the auxiliary frequencies.

Again this embodiment shows an amplifier 5, the input circuit of which is connected to the mixer or beater $b$. Filters $S_3$ and $S_1$ are connected in series to the output circuit of amplifier tubes, while the outputs of filters $S_3$ and $S_1$ are connected to the inputs of mixer $a$, the output of which is fed back to the input of mixer or beater $b$.

In selecting the auxiliary frequencies $f$ and $3f$, the filters $S_1$ and $S_3$ are used instead of the tuned circuits 6 and 7 of the embodiment according to Figure 1.

A single first beater or mixer $a$ produces the frequencies $4f$ and $2f$ by combining, i. e., adding and substracting the frequencies $f$ and $3f$. The second beater or mixer ($b$)

reconstitutes the frequencies $f$ and $3f$ respectively by the difference between input frequency $F_0$, on the one hand, and the frequencies $4f$ and $2f$, on the other. It can also be seen from this embodiment that the relations or equations provided by the beaters or mixers $a$ and $b$ are sufficient to determine the frequency sought in an unique manner.

Figure 3:
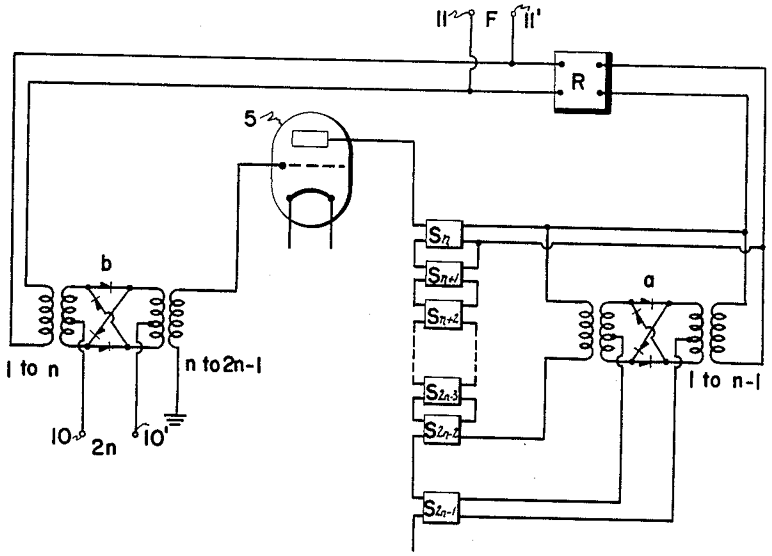
Figure 3 is a circuit diagram of still another modified embodiment in accordance with the present invention employing two modulators to divide an input frequency by an even number.

Figure 3 shows a modified embodiment according to the present invention, in case it is desired to divide by an even number $2n$.

The circuit arrangement according to Figure 3 also comprises an amplifier tube 5, with the beater or mixer $b$ connected to the input circuit thereof, and the modulator $a$ connected to the output thereof through filters $S_n$, $S_{n+1}$ . . . $S_{n2-1}$ which are connected in series.

The output of the beater or mixer $a$ is fed back to the input of the beater or mixer $b$ through a feed-back circuit including band-pass filter R.

In that case the multiples $n$, $n+1$, . . . $2n-1$ of the desired output frequency F are used as auxiliary frequencies.

Reference characters $Sn$, $Sn+1$ . . . $S_{2n-1}$ designates filters respectively tuned to the frequencies $n$, $n+1$, . . . $2n-1$. The modulator $a$ is controlled at its control terminal mid-points by the frequency $2n-1$, while the frequencies $n$, $n+1$ . . . $2n-1$ are fed to its input terminals, and the frequencies 1, 2 . . . $n-1$ are taken off at its output terminals. The frequency $n$ is fed back from filter $S_n$ directly to the input terminals of the beater or mixer $b$. The frequencies higher than $2n-1$ produced by intermodulation are blocked by the network R acting as a low-pass filter.

In the arrangement of Figure 3, the output frequency F may be taken off at the left terminals of low-pass filter network R after any frequencies higher than $2n-1$ are removed from the output of modulator $a$.

By generally designating by $f_k$ the frequency very close to $kf$, $k$ being an integer or fractional number as stated above, capable of being generated within the system by the operation thereof, it will be seen that the group of relations or equations between the frequencies at the input terminals and at the output terminals of the modulator $a$ is as follows:

(A)

$$f_1=f_{2n-1}-f_{2n-2}$$
$$f_2=f_{2n-1}-f_{2n-3}$$
$$\text{--------------}$$
$$f_{n-1}=f_{2n-1}-f_n$$

The relations or equations between the frequencies received and reconstituted by the beater or mixer $b$ are as follows:

(B)

$$2nf=f_1+f_{2n-1}$$
$$2nf=f_2+f_{2n-2}$$
$$\text{--------------}$$
$$2nf=f_{n-1}+f_{n+1}$$
$$2nf=f_n+f_n$$

This last equation gives: $f_n=nf$.

This frequency $nf$ plays a predominant part in the starting of the operation.

The replacement in equation B of the frequencies $f_1$, $f_2$ . . . $f_{n-1}$ by their values taken from equations A gives:

$$2nf=2f_{2n-1}-f_{2n-2}$$
$$2nf=f_{2n-1}+f_{2n-2}-f_{2n-3}$$
$$\text{--------------}$$
$$2nf=f_{2n-1}+f_{n+1}-f_n$$

We thus get $n-1$ relations to determine $f_{n+1}$, $f_{n+2}$ . . . $f_{2n-1}$, the quantity $f_n$ being known.

The determinant $D_{n-1}$ of these linear equations is $$D_{n-1}=\begin{vmatrix} 2 & -1 & 0 & \cdots & & 0 \\ 1 & 1 & -1 & \cdots & & 0 \\ 1 & 0 & 1 & -1 & \cdots & 0 \\ \multicolumn{6}{c}{\text{--------------}} \\ 1 & 0 & 0 & 0 \cdots 1 & & -1 \\ 1 & 0 & 0 & 0 \cdots 0 & & 1 \end{vmatrix} = \begin{vmatrix} n & 0 & 0 & \cdots & & 0 \\ 1 & 1 & -1 & \cdots & & 0 \\ 1 & 0 & 1 & \cdots & -1 & 0 \\ \multicolumn{6}{c}{\text{--------------}} \\ 1 & 0 & 0 & \cdots & 1 & -1 \\ 1 & 0 & 0 & \cdots & 0 & 1 \end{vmatrix} = n$$

Hence the desired operation is thereby ensured.

Figure 4:
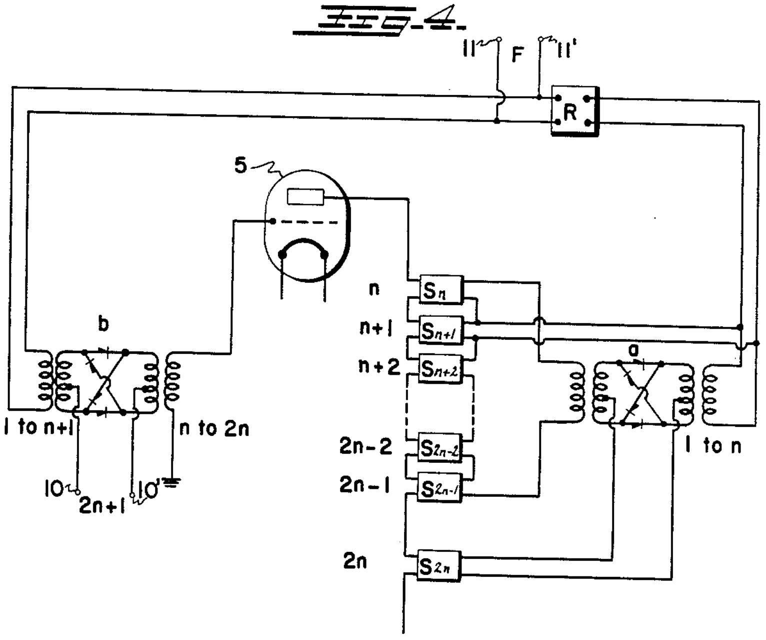
Figure 4 is a circuit diagram of a further modified embodiment in accordance with the present invention similar to Figure 3, employing two modulators to divide an input frequency by an odd number.

Figure 4 shows an embodiment of an arrangement similar to Figure 3 applied to the case in which it is desired to obtain a division by an odd number, $2n+1$.

The circuit arrangement of Figure 4 is quite similar to that of Figure 3 except that the feed back takes place through a different filter while the selective filter $S_{2n}$ for the highest frequency is tuned to a frequency $2n$.

In that case the $n+1$ multiples of the desired output frequency of the order, $n$, $n+1$ . . . $2n-1$, $2n$ are used as auxiliary frequencies, from which the beater or mixer $a$, fed with the frequency $2n$ at its control terminal mid-points and with the set of the other frequencies at its input terminals, reconstitutes at its output terminals the frequencies of the order of 1 . . . $n$. Moreover, the frequency $n+1$ is fed back directly to the input terminals of modulator $b$.

In the embodiment of Figure 4, the output frequency $$F=\frac{F_0}{2n+1}$$

may be taken off at the left terminals of low-pass filter network R after the frequencies higher than $2n$ are removed from the output of modulator $a$.

By again designating by $f_k$ the frequency very close to $kf$ produced during operation of the system, for values of $k$ different from $n$, it is necessary to distinguish in that case between the auxiliary frequency $fn$ and the frequency $f'n$ generated by the beater or mixer $a$ from the frequency $fn$.

The equations of the group (A) are then written as:

(A)

$$f_1=f_{2n}-f_{2n-1}$$
$$f_2=f_{2n}-f_{2n-2}$$
$$\text{--------------}$$
$$f_{n-1}=f_{2n}-f_{n+1}$$
$$f'_n=f_{2n}-f_n$$

and the Equations B are written as:

(B)

$$(2n+1)f=f_1+f_{2n}$$
$$(2n+1)f=f_2+f_{2n-1}$$
$$\text{--------------}$$
$$(2n+1)f=f_{n-1}+f_{n+2}$$
$$(2n+1)f=f'_n+f_{n+1}$$
$$(2n+1)f=f_{n+1}+f_n$$

The comparison of the two last equations of the set (B) shows that $f'n=fn$, so that the last equation of set (A) becomes:

$$f_n=f_{2n}-f_n \text{ or } f_{2n}-2f_n=0$$

Replacing $f_1$, $f_2$ . . . $f_{n-1}$ in the equations of set (B) by their values taken from the set of Equations A, we get $$(2n+1)f=f_{2n}+f_{2n}-f_{2n-1}$$
$$(2n+1)f=f_{2n}+f_{2n-1}-f_{2n-2}$$
$$\text{--------------}$$
$$(2n+1)f=f_{2n}+f_{n+2}-f_{n+1}$$

By here replacing $f_n$ by $f_{2n}-f_n$ in the equation $$(2n+1)f=f_n+f_{n+1}$$

it follows:

$$(2n+1)f=f_{2n}+f_{n+1}-f_n$$

By adding the relation arrived at $f2n=2fn$, $(2n+1)$ relations or equations are obtained in order to determine $fn$, $fn+1$ . . . $f2n$.

It will easily be seen that the determinant of these equations is equal to $-(2n+1)$, which ensures the correct division of the given frequency.

In the examples given the whole series of the multiples of $$\frac{F_0}{2n} \text{ or } \frac{F_0}{2n+1}$$

lower than $F_0$ are obtained.

This peculiarity may be used to advantage in certain cases, for example, in standard frequency generators employed in frequency-meters, as preferably a division by 10 is employed in these devices, the present invention permits the generation, in a single operation, of the harmonic series:

$$\frac{F}{10}, \frac{2F}{10} \ldots \frac{9F}{10}$$

In that case, the number of different modulations necessary is equal to 9.

According to another feature of the present invention, however, if the frequency $$f=\frac{F_0}{n}$$

is sought, it is possible, by a suitable choice of the auxiliary frequencies, to reduce the number of modulations required.

The number of auxiliary frequencies is chosen between 1 and $n/2$, if $n$ is an integer, or between 1 and $k/2$, if $n$ is equal to $k/2$, $k$ and 1 being prime numbers with respect to each other, so as to ensure the greatest possible saving in the number of elements used, such as modulators, tuned circuits, tubes; $k$ is an integer or fraction, as stated above.

According to another feature of the present invention, as the voltages developed in starting are not as a rule sufficient in magnitude to ensure a suitable polarization of the rectifiers, a fixed polarization, for example, by a fixed voltage, is introduced between the control terminal mid-points, which permits starting by bringing the operating point of the rectifiers into the linear range of their characteristic, and which can be maintained without difficulty or risk of error, once the starting has been effected.

While still remaining within the scope of the present invention, it is possible to employ beaters or mixers, to the exclusion of the multipliers, in the case in which it is desired to effect a frequency multiplication. The advantage which is found in case of division remains important in case of multiplication, by the elimination of saturated stages, which impose relatively high voltages.

Moreover, as has been seen in the three last examples, it is possible to reduce the number of beaters or mixers by using the same modulator for several different modulations, because owing to the linear operation of well-balanced symmetrical beaters or mixers, no harmful intermodulation occurs.

It will be apparent to those skilled in the art that our invention is susceptible of numerous modifications to adapt the same to particular conditions, and all such modifications which are within the scope of the appended claims are considered to be comprehended within the spirit of our invention.

What we claim is:

1. In a frequency dividing system for dividing a given signal of frequency $F_0$ to a desired output signal of frequency $$F=\frac{F_0}{n}$$

where $n$ is an even integer, the combination comprising a source for said given signal of frequency $F_0$ to be divided, a first mixer having input terminals, control terminals and output terminals, a second mixer having input terminals, control terminals and output terminals, an amplifier tube having a grid circuit and a plate circuit, a plurality of frequency selective filter units with the inputs thereof connected in series in said plate circuit, said filter units being tuned to the frequencies of $nF$, $(n+1)F$, $(n+2)F$, . . . $(2n-1)F$ respectively, means for connecting the output terminals of said first mixer to said grid circuit, means for connecting said source to the control terminals of said first mixer, first coupling means for coupling the output of one of said filter units tuned to the frequency $(2n-1)F$ to the control terminals of said second mixer, second coupling means for coupling the outputs of all of said filter units except said one in series to the input terminals of said second mixer, and feed-back circuit means including a low-pass filter operative to cut out all frequencies above frequency $(2n-1)F$ for feeding back the output of said one filter unit in parallel with the output from the output terminals of said second mixer to the input terminal of said first mixer.

2. In a frequency dividing system for use with an input signal of frequency $F_0$ and to provide an output signal of frequency F equal to $$\frac{F_0}{2n+1}$$

where $2n+1$ is an odd integer, the combination comprising a first mixer having input terminals, control terminals and output terminals, a second mixer having input terminals, output terminals and control terminals, an amplifier tube having an input grid circuit and a plate output circuit, a plurality of frequency selective filter units with the inputs thereof connected in series in said plate output circuit, said filter units being respectively tuned to select the frequencies $nF$, $(n+1)F$, $(n+2)F$ . . . $2nf$, the output terminals of said first mixer being connected to said grid input circuit, a source for supplying a signal of frequency $F_0$, means for connecting said source to the control terminals of said first mixer, first coupling means for coupling the output of the filter unit tuned to the frequency $2nF$ to the control terminals of said second mixer, second coupling means for coupling the outputs of all said filter units except the filter unit tuned to the frequency $2nF$ in series to the input terminals of said second mixer, and a feed-back circuit comprising a low-pass filter to eliminate all frequencies above $2nF$ and to feed back the output from the filter unit tuned to the frequency $(n+1)F$ in parallel with the output from the output terminals of said second mixer to the input terminals of said first mixer.

3. A frequency divider for dividing the frequency of a given signal to a desired frequency comprising an amplifier having an input circuit and an output circuit, a plurality of selective circuits connected in series in said output circuit, one of said selective circuits being tuned to the desired frequency and the others being tuned to the harmonics of said desired frequency, two groups of mixers each having input terminals, control terminals and output terminals, means for connecting all the terminals of the mixers of said first group in parallel to a source producing the given signal with a frequency to be divided, means for connecting the output terminals of the mixers of said first group in series with said input circuit of said amplifier, coupling means connected between the input terminals of the mixers of said first group and the output terminals of the mixers of said second group, means for connecting the input terminals of the mixers of said second group to the selective circuits tuned to the harmonics of the desired frequency, means connecting the control terminals of the mixers of said second group in parallel to said one selective circuit tuned to the desired frequency, and means coupled to said one selective circuit for deriving a voltage at said desired frequency.

4. In a frequency dividing system for use with a given signal of a frequency $F_0$ and with a desired output signal of frequency F equal to $$\frac{F_0}{5}$$

the combination comprising a first mixer having input terminals, control terminals, and output terminals, a second mixer having input terminals, control terminals, and output terminals, an amplifier tube having a grid circuit and a plate circuit, a first and a second resonant circuit having their inputs connected in series in said plate circuit, the first resonant circuit being tuned to the desired output frequency F, the second resonant circuit being tuned to a frequency 3F, first means for coupling said grid circuit to the output terminals of the first mixer, means for applying a signal of frequency $F_0$ to the control terminals of said first mixer, second means for coupling the output of said first resonant circuit to the control terminals of said second mixer, third means for coupling the output of the second resonant circuit to the input terminals of said second mixer, output means coupled to said second coupling means, and fourth means for coupling the output terminals of said second mixer to the input terminals of said first mixer.

5. In a frequency divider for use with a given signal of a frequency $F_0$ and with a desired output signal of frequency F equal to $$\frac{F_0}{k}$$

the combination comprising an amplifier having an input circuit and an output circuit, a plurality of selective circuits whose number is an integer equal to $k/2$ or to the next lower integer if $k/2$ is not an integer, said selective circuits being connected in series in the output circuit of said amplifier, the first one of said selective circuits being tuned to the $(k-1)^{th}$ harmonic of the desired output frequency F and the other selective circuits being tuned to other harmonics within a range below said desired frequency, two mixers having input terminals, control terminals and output terminals, means for applying to the control terminals of said first mixer a signal source producing the frequency to be divided, means for connecting the output terminals of said first mixer to the input circuit of said amplifier, coupling means connected between the input terminals of said first mixer and the output terminals of said second mixer, means for connecting the control terminals of said second mixer to said first selective circuit and for connecting the input terminals of said second mixer to the terminals of the other selective circuits connected in series, means for connecting the terminals of the selective circuit tuned to the harmonic of the desired frequency equal to $k/2$ or the next lower integer if $k/2$ is not an integer to the output terminals of said second mixer, and means for deriving the desired frequency at the input terminals of said first mixer.

6. In a frequency multiplying and dividing system, signal means for supplying a frequency to yield harmonically related derived frequencies, first mixing means having input terminals, control terminals and output terminals, second mixing means having input terminals, control terminals and output terminals, an amplifier tube having a grid circuit and a plate circuit, a plurality of frequency-selective tuned resonant circuits with the inputs thereof connected in series in said plate circuit, first means for coupling said grid circuit to the output terminals of said first mixing means, said signal means being connected to the control terminals of said first mixing means, second means for coupling the output of some of said tuned resonant circuits to the control terminals of said second mixing means, third means for coupling the output of others of said tuned resonant circuits to the input terminals of said second mixing means, output means coupled to said second means, and a feed-back circuit connected between the output terminals of said second mixing means and the input terminals of said first mixing means to feed back the output from the output terminals of said second mixing means to the input terminals of said first mixing means.

7. In a frequency dividing system for receiving an input signal of frequency $F_0$ and for delivering an output signal of frequency $$F=\frac{F_0}{5}$$

means for supplying a signal of the frequency $F_0$ to be divided, a first mixer having input terminals, control terminals and output terminals, a second mixer having input terminals, control terminals and output terminals, an amplifier tube having a grid circuit and a plate circuit, a first and a second tuned resonant circuit with the inputs thereof connected in series in said plate circuit, said first tuned circuit being tuned to the desired output frequency F, said second tuned circuit being tuned to a frequency 2F, means for coupling said grid circuit to the output terminals of said first and second mixer, said first-mentioned means being connected in parallel to the control terminals of said first and of said second mixer, a third mixer having input terminnals, control terminals and output terminals, a fourth mixer having input terminals, control terminals and output terminals, first coupling means for coupling the output of said first tuned circuit in parallel to the control terminals of said third mixer and of said fourth mixer, second coupling means for coupling the output of said second tuned circuit to the input terminals of said third mixer, output means coupled to said first coupling means, a first feed-back circuit comprising a tuned circuit element tuned to the frequency 3F for feeding back the output from the output terminals of said third mixer to the input terminals of said first mixer, means for applying the ouput of said third mixer to the input of said fourth mixer, and a second feed-back circuit comprising a tuned circuit element tuned to the frequency 4F for feeding back energy between the output terminals of said fourth mixer and the input terminals of said second mixer.

8. A frequency dividing system comprising first mixer means having a first input circuit and a second input circuit and an output circuit, means for applying only the signal to be divided to said first input circuit, means for applying auxiliary signals to said second input circuit, amplifier means having an input circuit and an output circuit, means for connecting the output circuit of said first mixer means to the input circuit of said amplifier means, a second mixer means having a first and a second input circuit and an output circuit, a plurality of tuned circuit means, means including said tuned circuit means for connecting the output circuit of said amplifier means with said first and second input circuits of said second mixer means, and feed-back means for connecting the output circuit of said second mixer means to the second input circuit of said first mixer means.

9. A frequency dividing system comprising first mixer means having a first input circuit and a second input circuit and an output circuit, means for applying only the signal to be divided to said first input circuit, means for applying auxiliary signals to said second input circuit, amplifying means having an input circuit and an output circuit, means for connecting the output circuit of said first mixer means to the input circuit of said amplifying means, a second mixer means having a first input circuit and a second input circuit and an output circuit, a plurality of tuned circuit means, one of said tuned circuit means being tuned to the frequency of the divided signal, means including said tuned circuit means for connecting the output of said amplifying means with said first and second input circuits of said second mixer means, and means for connecting the output circuit of said second mixer means to the second input circuit of said first mixer means.

10. A frequency dividing system comprising first balanced mixer means having a first input circuit and a second input circuit and an output circuit, means for applying only the signal to be divided to said first input circuit, means for applying auxiliary signals to said second input circuit, amplifying means having an input circuit and an output circuit, means for connecting the output circuit of said first mixer means to the input circuit of said amplifying means, a second balanced mixer means having a first input circuit and a second input circuit and an output circuit, a plurality of tuned circuit means, means including said tuned circuit means for connecting the output circuit of said amplifying means with said first and second input circuits of said second mixer means, and means for connecting the output circuit of said second mixer means to the second input circuit of said first mixer means.

11. A frequency dividing system comprising first mixer means having a first input circuit, a second input circuit and an output circuit, means for applying only the signal to be divided to said first input circuit, means for applying auxiliary signals to said second input circuit, amplifying means having an input circuit and an output circuit, means for connecting the output circuit of said first mixer means to the input circuit of said amplifying means, a second mixer means having a first input circuit and a second input circuit and an output means, a plurality of tuned circuit means, connecting means including said tuned circuit means for connecting the output circuit of said amplifying means with said first and second input circuits of said second mixer means, connecting means for connecting the output circuit of said second mixer means to the second input circuit of said first mixer means, and means for deriving the divided signals from one of the connecting means connected with said second mixer means.

12. A frequency dividing system for dividing a signal by $n$, where $n$ is any integer comprising first mixer means having a first input circuit, a second input circuit and an output circuit, means for applying only the signal to be divided to said first input circuit, means for applying auxiliary signals to said second input circuit, said auxiliary signals bearing a relationship of $m/n$ to said first-mentioned signal, where $m$ is any integer $\pm n$, amplifier means having an input circuit and an output circuit, means for connecting the output circuit of said first mixer means to the input circuit of said amplifier means, a second mixer means having a first input circuit, a second input circuit and an output circuit, a plurality of tuned circuit means, means including said tuned circuit means for connecting the output circuit of said amplifier means with said first and second input circuits of said second mixer means, and means for connecting the output circuit of said second mixer means to the second input circuit of said first mixer means.

13. A frequency dividing system for dividing a signal by $n$ comprising first mixer means having a first input circuit, a second input circuit and an output circuit, means for applying only the signal of frequency $F_0$ to be divided to said first input circuit, means for applying auxiliary signals to said second input circuit, amplifier means having an input circuit and an output circuit, means for connecting the output circuit of said first mixer means to the input circuit of said amplifier means, a second mixer means having a first input circuit, a second input circuit and an output circuit, a plurality of tuned circuit means, means including said tuned circuit means for connecting the output circuit of said amplifier means with said first and second input circuits of said second mixer means, and means for connecting the output circuit of said second mixer means to the second input circuit of said first mixer means, said auxiliary signals bearing a relationship of $m/n$ to said first-mentioned signal, wherein $m/n$ is smaller than one, wherein $n$ is any integer and $m$ is any integer smaller than $n$.

14. The combination according to claim 13, wherein one of said tuned circuit means is tuned to the frequency of $$\frac{F_0}{n}$$

References Cited in the file of this patent

UNITED STATES PATENTS

| | | |
|---|---|---|
| 2,025,610 | Plebanski | Dec. 24, 1935 |
| 2,159,595 | Miller | May 23, 1939 |
| 2,159,596 | Miller | May 23, 1939 |
| 2,495,317 | Dorbec | Jan. 24, 1950 |
| 2,555,960 | Delvaux | June 5, 1951 |